United States Patent Office 2,835,201
Patented May 20, 1958

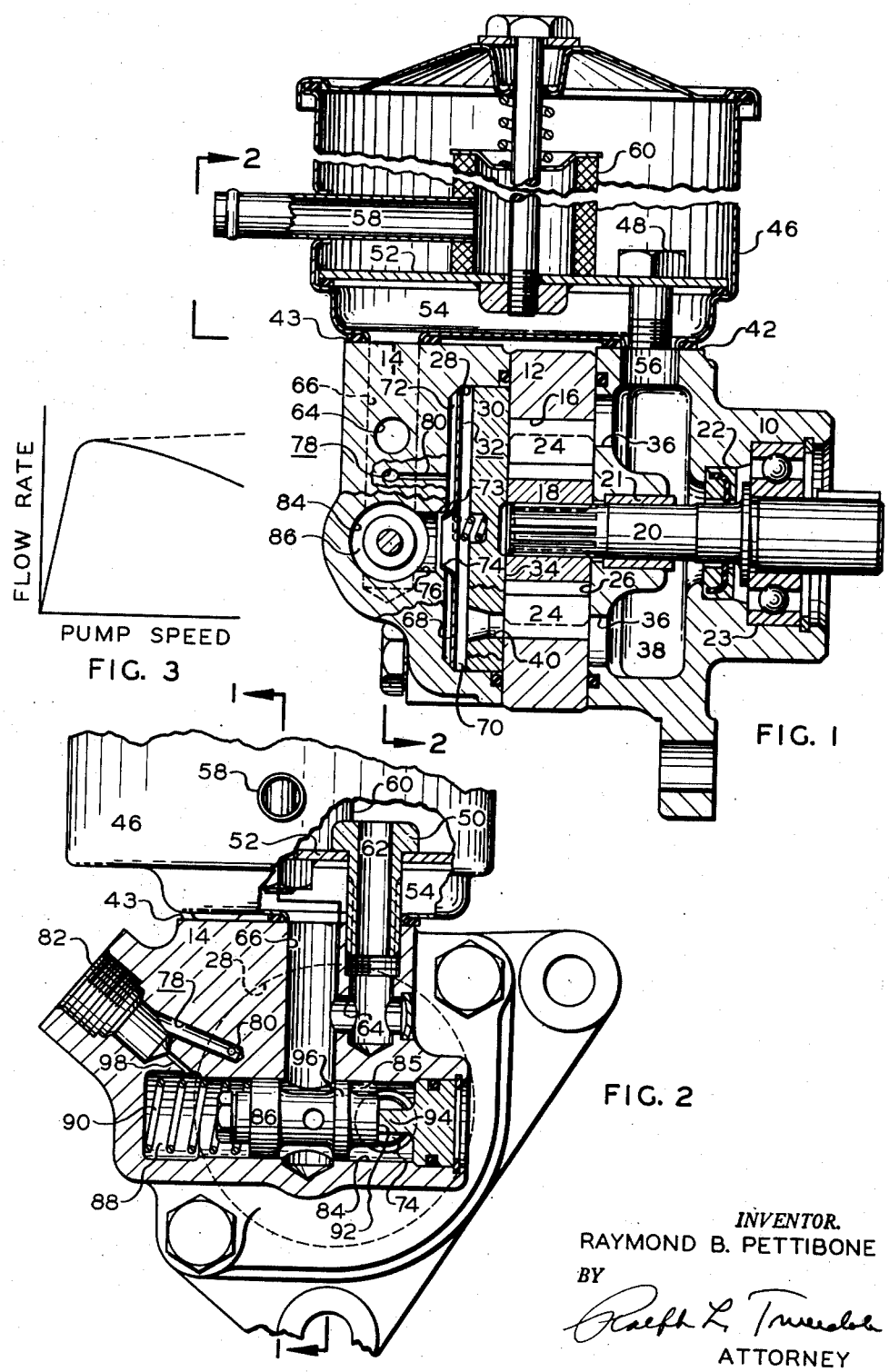

2,835,201

POWER TRANSMISSION

Raymond B. Pettibone, Detroit, Mich., assignor to Vickers Incorporated, Detroit, Mich., a corporation of Michigan Application May 24, 1955, Serial No. 510,671

8 Claims. (Cl. 103—42)

This invention relates to power transmissions, and is particularly applicable to those of the type comprising two or more fluid pressure energy translating devices, one of which may function as a pump and another as a fluid motor.

More particularly the invention relates to a flow control system for such a transmission in which the pump is driven by a variable speed prime mover, such as the engine of a motor vehicle.

In such transmissions the fluid actuated accessories often require as high a rate of fluid supply during engine idle periods as during high speed engine operation. For example, this is true in the case of a steering booster. Thus, where a constant displacement pump directly driven from the vehicle engine is utilized, the pump discharge flow rate at engine idle must be sufficiently high for satisfactory accessory operation. As engine speed increases, so also does the discharge rate of the pumping mechanism. In the usual motor vehicle the ratio of engine idle speed to top speed is approximately one to ten. Thus, there is an over-supply of fluid at all times when engine speeds are substantially above idle. Where precise control is required, as in steering, this variable over-supply presents a serious problem.

The prior art has attacked the problem of fluid oversupply to the load by providing spill-over, or by-pass, type flow controls in the system. The usual arrangement has a by-pass valve at the pump outlet which is spring biased to a closed position in which all fluid pumped goes to the load. A restriction to fluid flow in the motor line creates a pressure differential which is proportional to the flow rate to the work and this differential is utilized to control the by-pass valve. When flow to the work reaches a certain desired magnitude, the pressure differential overcomes the valve spring and causes the by-pass valve to shift and thus divert pumped fluid away from the work and back to the reservoir. When the cracking point of the by-pass valve has been reached, further increases in pumping rate result in greater opening of the valve and increased flow of by-pass fluid. Such a spillover type valve is shown in Figure 1 of the patent to Amsler, No. 1,467,522.

The above described arrangement has been quite satisfactory but has one important disadvantage. This disadvantage results largely from the rate characteristics of the biasing springs used in the by-pass valve. Due to the spring rate, an increasing pressure differential is required to move the by-pass valve from the cracking position to the wide open position. An additional factor is the velocity effect of the fluid being by-passed, which may act on the by-pass valve with the effect of increasing spring load. Since the valve actuating pressure differential is proportional to flow rate to the work, flow rate to work must increase as the valve moves from cracking to wide open. The consequent increase in flow rate to the work resulting from variations in pump speed above the valve cracking point is of substantial magnitude and has been found detrimental to precise control in such applications as steering systems.

Further, extremely high pump speeds are normally associated with high vehicle speeds. Since at high vehicle speeds maneuvers are of necessity limited, a high rate of supply to the steering booster is not required. If the high supply rate is continued, it results in waste of power and excessive heating of the oil. Thus, power can be conserved and operating temperatures reduced by lowering the flow rate to the booster during high speed vehicle operation.

It is an object of this invention to provide an improved, low cost fluid flow control system for delivering a substantially contant fluid flow rate to a load from a variable flow rate source, throughout a wide range of operating speeds.

It is a further object to provide such a system in which the flow rate is more accurately controllable than in prior devices and, if desired, can be made to diminish with increasing pump speed.

Another object is to provide such a system which is well adapted for application to conventional pumping structures of the vane type.

It is also an object to provide low cost pumping structure having such a system incorporated therein.

Further objects and advantages of the present invention will be apparent from the following description, reference being had to the accompanying drawing wherein a preferred form of the present invention is clearly shown.

In the drawing:

Figure 1 is a longitudinal cross-sectional view of pumping structure incorporating the present invention, taken on line 1—1 of Figure 2.

Figure 2 is a sectional view taken on line 2—2 of Figure 1.

Figure 3 compares actual performance curves of a pump and flow control valve embodying the present invention and a conventional pump and flow control valve.

Referring now to Figure 1, there is shown pumping structure of the general type described in the patent to Gardiner et al., No. 2,544,988. The pumping structure includes a body member 10, a ring 12, and a head 14. The ring 12 has an elliptically shaped chamber 16 in which a rotor 18 is telescopically disposed. Rotor 18 is supported on and driven by a drive shaft 20 which is rotatably carried on bearings 21 and 23. The usual shaft seal 22 is provided to prevent leakage from the body 10 at the point of emergence therefrom of the shaft 20. Rotor 18 has a plurality of radial slots therein, each of which carries a vane 24. The vanes 24 extend from rotor 18 to abut the elliptical track 16 in ring 12. Rotor 18, ring 12, and vanes 24 are axially abutted at one side by a plane face 26 of the body member 10.

The head 14 includes a recess 28 in which is positioned a pressure plate 30. The periphery of pressure plate 30 engages the chamber 28 in a fluid sealing relation therewith to form a pressure chamber 32. Fluid pressure in chamber 32 biases pressure plate 30 rightwardly and urges the plane face 34 of pressure plate 30 into axial abutment with ring 12, rotor 18, and vanes 24. When the rotor 18 is driven by shaft 20, the outer ends of the vanes 24 will follow the cam track 16. The intervane working chamber between each pair of adjacent vanes will undergo alternate expansion and contraction due to outward and inward movement of the vanes, induced by track 16. The expanding intervane chambers communicate with inlet ports 36 which lead to an inlet manifold chamber 38. The contracting intervane working chambers discharge fluid under pressure through a pair of delivery ports 40 in the pressure plate 30, only one of which is shown, into the pressure chamber 32. The pumping structure thus far described is similar in nature to that in the Gardiner et al. patent. A more detailed description may be obtained by reference to that patent.

Body member 10 and head member 14 have thereon mounting pads 42 and 43, respectively. A reservoir 46 straddles the ring 12 and is gasket mounted on the pads 42 and 43. The reservoir 46 is secured to body 10 and head 14 by a pair of bolts 48 and 50 which extend through a false bottom 52. The false bottom 52 provides a passage 54 which communicates with the inlet manifold 38 through a passage 56. Fluid returning from the work passes through a return tube 58 and into a filter 60. The returning fluid then passes through the filter 60 and is intermixed with cool, deaerated fluid in the reservoir 46. Clean, filtered fluid is supplied to the pump inlet, as required, through the central passage 62 in the hollow bolt 50, and a cross drilled passage 64 which communicates with a by-pass and replenishing passage 66. Passage 66 leads upward to communicate with the passage 54 in the tank bottom.

The pressure chamber generally designated 32 has inserted therein a baffle 68. Baffle 68 divides pressure chamber 32 into a first chamber 70, which receives fluid from the discharge ports 40, and a second chamber 72. Communication between chamber 70 and 72 is effected in the region 73 at the throat of a nozzle shaped aperture 74, in the baffle 68. Nozzle 74 is directed into a passage 76 having a cross sectional area somewhat larger than that of nozzle 74. A delivery passage generally designated 78 having therein a constriction or metering orifice 80 leads from chamber 72 to an external delivery connection port 82.

There is provided in the head 14 a valve bore 84 which receives a control valve 86. Valve 86 divides the bore 84 into a pair of opposed pressure chambers 85 and 88, and has equal and opposed areas exposed to pressure in those chambers. The valve 86 is biased to the position illustrated by a spring 90, wherein the valve nose 92 abuts a stop 94. Valve 86 includes a land 96 which, in the spring biased position illustrated, blocks communication between the pressure chamber 85 and the by-pass and return passage 66. Valve pressure chamber 85 communicates with the pump pressure chamber 32 through the passage 76, into which is directed the nozzle 74. A restrictive drilled passage 98 extends from the delivery passage 78 at a point downstream from the restriction 80 to communicate with the valve pressure chamber 88. Valve 86 is responsive to pressure differentials between chambers 85 and 88 to shift against the bias of spring 90 and effect modulated communication between chamber 85 and the by-pass and return passage 66.

In slow speed pump operation, the entire quantity of fluid pumped will pass into the fluid receiving first chamber 70, through the nozzle 74 in baffle 68, and around the lip thereof, back into the second, or delivery, chamber 72. From chamber 72 the fluid will pass through the restriction 80 in delivery conduit 78 and pass to the external delivery connection port 82. During such low speed operation the spring 90 will maintain the flow control valve 86 in the closed position, wherein the valve pressure chamber 85 is isolated from the by-pass and return passage 66. As the speed of the pumping mechanism is increased, the discharge rate will also increase. A point will be reached at which the flow rate through the delivery passage 78 produces a pressure drop across restriction 80 which, reacting across valve spool 86, will overcome the spring 90 and shift valve 86 to its cracking position, wherein initial communication is established between the chamber 85 and the by-pass return passage 66. In the conventional system, which would not have the baffle plate 68, the metered flow rate would continue to increase with increasing pump speed. This is due to the rate of the valve biasing spring and the velocity effect of the by-pass fluid on the end of valve spool 86. The metered flow curve of such a conventional system is shown by the dotted curve of Figure 3. The continuously increasingly metered volume has a most adverse effect on efficiency and cooling in the high-speed ranges. Since pressure drop through, for example, an open center load valve will increase, so will the pressure drop in the fluid by-passed by the flow control valve. The pressure energy of the by-passed fluid is nearly all converted to heat, much power is wasted, and cooling problems become highly critical.

The metered flow rate vs. pump speed curve of a pump and valve combination embodying the present invention is shown by the solid line in Figure 3. The drooping curve is made possible by the baffle and nozzle, and the disposition of various ports and passages as hereinbefore set forth. As the pump speed increases past the point where full delivery through restriction 80 causes valve 86 to crack, an additional factor becomes of increasing importance in the control of valve 86. As was heretofore described, delivery chamber 72 is in communication at 73 with the throat of nozzle 74. As increasing flow takes place through the passage 76 and is by-passed from the chamber 85 to passage 66, there will be an increasing pressure differential between the point 73, where chamber 72 communicates with the throat of nozzle 74, and chamber 85 into which nozzle 74 discharges through the passage 76. Since it is the pressure at the throat of the nozzle which, less the pressure drop across restriction 80, is conducted to the pressure chamber 88, there is a component of the differential applied across valve 86 which is not a function of flow rate to the load. That component is substantially proportional to pump speed after cracking of valve 86. It is thus possible to increase the operating force on valve 86 and divert an increasing amount of fluid into the by-pass passage without increase in the metered flow rate. In fact, as shown by Figure 3, the metered flow rate can actually be made to fall off during increasing pump speed.

The present invention has provided a fluid pump and flow control unit for supplying a desired flow rate to a work load at varying pump speeds. The control is responsive to both flow rate to the load, and to pump speed. Speed responsiveness has been obtained without undue complication of the pumping structure and without appreciably increasing the cost. Conventional structure may be easily adapted to practice of this invention.

While the form of embodiment of the invention as herein disclosed constitutes a preferred form, it is to be understood that other forms might be adopted, all coming within the scope of the claims which follow.

What is claimed is as follows:

1. A fluid flow control system for delivering a controlled flow rate to a load from a variable flow rate source, comprising: a first chamber for receiving fluid from the source; a second chamber; delivery passage means extending from the second chamber and having flow restrictive means therein; baffle means separating the first and second chambers; means forming a by-pass passage opening into said second chamber to form an aperture to conduct excess flow from the source; means forming a nozzle in the baffle means establishing communication between the first and second chambers and directing flow into the by-pass passage aperture in said second chamber; valve means controlling the by-pass passage; and means for operating the valve means responsive to the pressure differential between a point in the delivery passage downstream of said flow restrictive means and a point in the by-pass passage downstream of said nozzle.

2. A fluid flow control system for delivering a controlled flow rate to a load from a variable flow rate source, comprising: a first chamber for receiving fluid from the source; a second chamber; delivery passage means extending from the second chamber and having flow restrictive means therein; baffle means separating the first and second chambers; means forming a by-pass passage opening into said second chamber to form an aperture to conduct excess flow from the source; means forming a nozzle in the baffle means establishing communication between the first and second chambers and directing flow into the by-pass passage aperture in said second chamber; normally closed valve means controlling the by-pass passage; and means for operating the valve means responsive to the pressure differential between a point in the delivery passage downstream of said flow restrictive means and a point in the py-pass passage downstream of said nozzle.

3. A fluid flow control system for delivering a controlled flow rate to a load from a variable flow rate source, comprising: a first chamber for receiving fluid from the source; a second chamber; delivery passage means extending from the second chamber and having flow restrictive means therein; baffle means separating the first and second chambers; means forming a by-pass passage opening into said second chamber to form an aperture to conduct excess flow from the source; means forming a nozzle in the baffle means establishing communication between the first and second chambers at the throat thereof and directing flow into the by-pass passage aperture in said second chamber; valve means controlling the by-pass passage; and means for operating the valve means responsive to the pressure differential between a point in the delivery passage downstream of said flow restrictive means and a point in the by-pass passage downstream of said nozzle.

4. A fluid flow control system for delivering a controlled flow rate to a load from a variable flow rate source, comprising: a first chamber for receiving fluid from the source; a second chamber; delivery passage means extending from the second chamber and having flow restrictive means therein; baffle means separating the first and second chambers; means forming a by-pass passage opening into said second chamber to form an aperture to conduct excess flow from the source; means forming a nozzle in the baffle means establishing communication between the first and second chambers and directing flow longitudinally into the by-pass passage aperture in said second chamber; valve means controlling the by-pass passage; and means for operating the valve means responsive to the pressure differential between a point in the delivery passage downstream of said flow restrictive means and a point in the by-pass passage downstream of said nozzle.

5. A fluid flow control system for delivering a controlled flow rate to a load from a variable flow rate source, comprising: a first chamber for receiving fluid from the source; a second chamber; delivery passage means extending from the second chamber and having flow restrictive means therein; baffle means separating the first and second chambers; means forming a by-pass passage opening into said second chamber to form an aperture to conduct excess flow from the source; means forming a nozzle in the baffle means establishing communication between the first and second chambers at the throat thereof and directing flow longitudinally into the by-pass passage aperture in said second chamber; normally closed valve means controlling the by-pass passage; and means for operating the valve means responsive to the pressure differential between a point in the delivery passage downstream of said flow restrictive means and a point in the by-pass passage downstream of said nozzle.

6. A fluid flow control system for delivering a controlled flow rate to a load from a variable flow rate source, comprising: a first chamber for receiving fluid from the source; a second chamber; delivery passage means extending from the second chamber and having flow restrictive means therein; baffle means separating the first and second chambers; means forming a by-pass passage opening into said second chamber to form an aperture to conduct excess flow from the source; means forming a nozzle in the baffle means establishing communication between the first and second chambers and directing flow into the by-pass passage aperture in said second chamber; valve means controlling the by-pass passage; and means for operating the valve means responsive to the pressure differential between two points in the system, one of which points is in the delivery passage downstream of the flow restrictive means therein.

7. A fluid flow control system for delivering a controlled flow rate to a load from variable speed rotary pumping mechanism, comprising: pressure plate means abutting said rotary pumping mechanism and having discharge ports extending therethrough; a pressure chamber into which said ports discharge, the pressure in which urges said plate into fluid sealing relation with the rotary pumping means; baffle means dividing said pressure chamber into a fluid receiving chamber and a delivery chamber; delivery passage means extending from the delivery chamber and having flow restrictive means therein; means forming a by-pass passage opening into said delivery chamber to form an aperture; means forming a nozzle in the baffle means establishing communication between the receiving and delivery chamber and directing flow into the by-pass passage aperture in said delivery chamber; valve means controlling the by-pass passage; and means for operating the valve means responsive to the pressure differential between two points in the system, one of which points is in the delivery passage downstream of the flow restrictive means therein.

8. A fluid flow control system for delivering a controlled flow rate to a load from variable speed rotary pumping mechanism, comprising: pressure plate means abutting said rotary pumping mechanism and having discharge ports extending therethrough; a pressure chamber, the pressure in which urges said plate into fluid sealing relation with the rotary pumping means; baffle means dividing said pressure chamber into a fluid receiving chamber and a delivery chamber; delivery passage means extending from the delivery chamber and having flow restrictive means therein; means forming a by-pass passage opening into said delivery chamber to form an aperture; means forming a nozzle in the baffle means establishing communication between the receiving and delivery chamber and directing flow into the by-pass passage aperture in said delivery chamber; valve means controlling the by-pass passage; and means for operating the valve means responsive to the pressure differential between a point in the delivery passage downstream of said flow restrictive means and a point in the by-pass passage downstream of said nozzle.

References Cited in the file of this patent

UNITED STATES PATENTS

| | | |
|---|---|---|
| 1,467,522 | Amsler | Sept. 11, 1923 |
| 1,733,183 | Dean | Oct. 29, 1929 |
| 2,544,988 | Gardiner | Mar. 13, 1951 |
| 2,665,704 | Kanuch | Jan. 12, 1954 |
| 2,724,335 | Eames | Nov. 22, 1955 |